United States Patent [19]
Bousaid

[11] 4,099,569
[45] Jul. 11, 1978

[54] OIL RECOVERY PROCESS USING A TAPERED SURFACTANT CONCENTRATION SLUG

[75] Inventor: Issam S. Bousaid, Houston, Tex.

[73] Assignee: Texaco Inc., New York, N.Y.

[21] Appl. No.: 724,679

[22] Filed: Sep. 20, 1976

[51] Int. Cl.² .............................................. E21B 43/22
[52] U.S. Cl. ................................... 166/273; 166/274
[58] Field of Search ........... 166/273, 274, 275, 305 R; 252/8.55 D

[56] References Cited
U.S. PATENT DOCUMENTS

| | | | |
|---|---|---|---|
| 3,369,602 | 2/1968 | Fallgatter et al. | 166/273 |
| 3,371,710 | 3/1968 | Harvey et al. | 166/273 |
| 3,670,819 | 6/1972 | Dauben et al. | 166/273 X |
| 3,768,560 | 10/1973 | Hill et al. | 166/273 X |

*Primary Examiner*—Stephen J. Novosad
*Attorney, Agent, or Firm*—Carl G. Ries; Thomas H. Whaley; Walter D. Hunter

[57] ABSTRACT

A process for recovering oil from a subterranean reservoir in which a surfactant slug injected into the formation via an injection well is passed through the formation and oil is recovered via a production well penetrating the formation. In this process a tapered surfactant concentration slug is employed in which the surfactant concentraction is increased, either incrementally or gradually, during the slug injection time.

9 Claims, 1 Drawing Figure

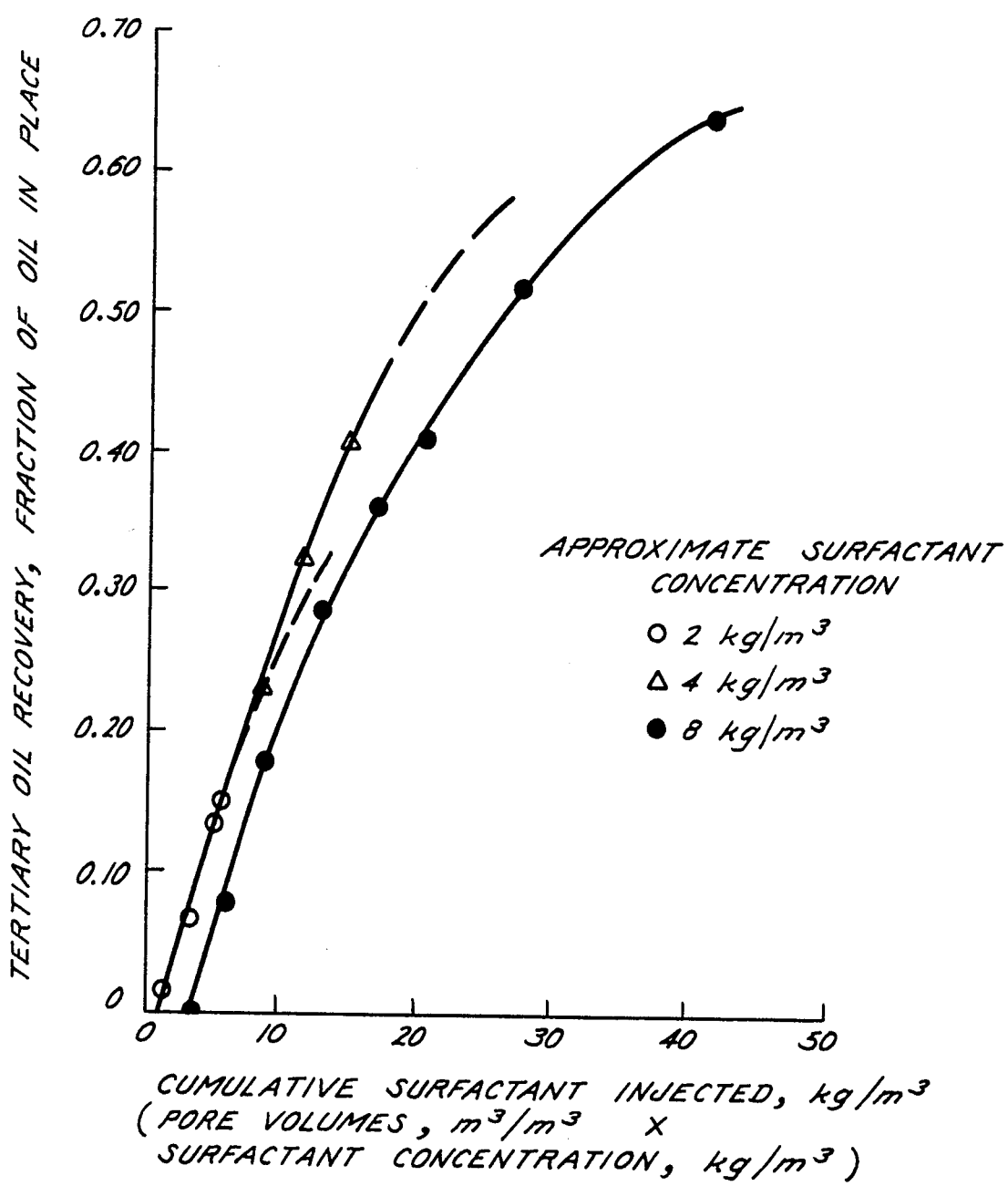

OIL RECOVERY PROCESS USING A TAPERED SURFACTANT CONCENTRATION SLUG

BACKGROUND OF THE INVENTION

1. Field of the Invention

This invention is concerned with a method of recovering oil from a subterranean reservoir. More particularly, this invention relates to an improved oil recovery process in which a surfactant slug injected into the formation via an injection well is forced through the formation and oil is recovered via a production well penetrating the same formation. During this recovery process the concentration of the surfactant is increased during the slug injection time.

2. Description of the Prior Art

The production of petroleum products is usually accomplished by drilling into a hydrocarbon-bearing formation and utilizing one of the well-known recovery methods for the recovery of the hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave 50 or more percent of the original hydrocarbons in place.

Thus, many large reserves of petroleum fluids from which only small recoveries have been realized by present commercial recovery methods, are yet to reach a potential recovery approaching their estimate oil-in-place.

Water flooding is one of the more widely practiced secondary recovery methods. A successful water flood may result in ultimate recovery of up to about 50 percent of the original hydrocarbons in place. However, generally the application of water flooding to many oil reservoirs results in much lower recoveries.

The newer development in recovery methods for heavy crudes is the use of steam injection which has been applied in several modifications, including the "push-pull" technique and through-put methods, and has resulted in significant recoveries in some areas. Crude recovery by this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes.

Consequently, process modifications have been developed which may incorporate additives to lessen the above cited disadvantages and thereby improve the efficiency of these processes. For example, surface-active agents and miscible liquids are utilized to decrease the interfacial tension between the water and the reservoir crude, and thickeners have been developed to adjust viscosity so as to inhibit fingering.

One of the principal objects of this invention is to provide an improved process for increasing the ultimate recovery of hydrocarbon from a hydrocarbon-bearing formation.

Another object of this invention is to provide an efficient method for the recovery of hydrocarbons from a hydrocarbon-bearing formation in which a surfactant slug is employed in which the surfactant concentration is increased as the slug is injected into the formation.

BRIEF DESCRIPTION OF THE INVENTION

In its broadest sense, this invention relates to a method of recovering oil from a subterranean oil-bearing formation having in communication therein at least one injection well and at least one production well comprising:

(a) injecting into the formation via the injection well a slug of the surfactant solution;

(b) injecting water into the formation via the injection well; and (c) recovering oil from the formation via the said production well and wherein the concentration of the surfactant of the said slug is increased as the slug is injected into the injection formation.

The increase in the surfactant concentration in the slug may be accomplished in a variety of ways such as incrementally in from about 2 to about 5 steps or more over the entire slug injection time or alternatively, the concentration of the surfactant in the surfactant slug may be increased continuously and in a linear manner if desired during the time in which the slug is being injected into the formation via the injection well. Optionally, prior to step (b) a slug of a polymer solution such as a solution of a polysaccharide or a polyacrylamide in water may be injected into the formation.

BRIEF DESCRIPTION OF THE DRAWING

FIG. 1 is a graph showing the increased recovery of oil achieved when limestone cores are flooded with surfactant solutions in which the concentration of the surfactant is increased during the injection time.

SUMMARY OF THE INVENTION

Generally in the surfactant flooding process of this invention a preflush slug of water equal to about 0.05 to about 0.30 reservoir pore volume and preferably about 0.10 to about 0.20 reservoir pore volume is injected into the formation via an injection well prior to the introduction of the surfactant solution slug. The water employed in the preflush step, which generally is of low salinity (i.e., less than 50,000 parts per million), should be compatible with subsequent chemical waters injected in the other steps in the process, and in addition, the water may contain, if desired, a sacrificial agent, which is preferably sodium tripolyphosphate, to reduce surfactant losses from the surfactant slug to the reservoir matrix.

In the next step of this surfactant flooding process a slug of a surfactant in water equal in amount to about 0.10 to about 0.60 pore volume is injected into the formation via the injection well. As previously pointed out one of the novel features of this invention is that during the injection of the surfactant slug the concentration of the surfactant therein is increased in any convenient manner such as incrementally or continuously and, for example, in a linear manner. For example, a slug having an initial concentration of about 0.2 percent by weight (i.e., 0.7 lbs/bbl) of the surfactant may be followed by an equal slug size having 0.4 percent by weight surfactant (i.e., 1.4 lb/bbl) following which a third slug of equal size is injected containing a surfactant concentration of 0.80 percent by weight (i.e., 2.8 lbs/bbl). Typically, the size of the three slugs may each be equal to about 0.10 pore volume for a total pore volume of 0.30. A final slug equal, for example, in size to 0.20 pore volume may then be injected at a maximum surfactant concentration of about 1 percent by weight (3.5 lbs/bbl). The surfactant concentration employed in the surfactant slugs may be varied over a wide range and generally will be from about 0.05 to about 2.0 or more weight percent. The total surfactant slug size employed in this process will range from about 0.10 to about 0.75 pore volume or more. The total slug size and the maximum surfactant concentration are usually determined from laboratory and field flood tests.

In the final step of this surfactant process a water drive is employed. The composition of the water injected via the injection well during the last phase should be compatible with all slug compositions injected during the process. Injection of the drive water is continued to completion of the chemical flood process.

If desired, prior to injection of the drive water a polymer slug may be injected for mobility control into the formation. Generally, the polymer slug will comprise the water solution of a polymer equal in volume to about 0.05 to about 0.50 pore volume or more containing a low concentration of polymer varying from about 200 to 1000 parts per million and preferably from about 200 to about 800 parts per million. If desired, the polymer slug may be tapered in a linear or any other convenient manner by decreasing the polymer concentration from its maximum value to 0. This mobility control procedure is a desirable measure which results in minimization of fingering (or channeling) of the drive water through the oil bank and prevents early breakthrough of the flood.

One class of hydrophilic polymer water thickening materials suitable for use in this invention is the polysaccharide or biopolymer compounds, many of which are readily available commercially. For example, in U.S. Pat. No. 3,208,518 there is disclosed a water flooding process wherein the viscosity of the flooding medium is increased by the use of high molecular weight polymers, specifically an ionic polysaccharide produced by the fermentation of carbohydrates by bacteria of the genus Xanthomonas, under controlled pH conditions.

Numerous other polymers are suitable for use in this invention such as partially hydrolyzed polyacrylamide which may be graphically illustrated by the following formula:

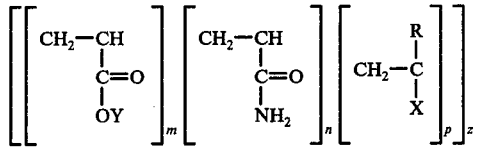

wherein Y represents hydrogen, ammonium, and alkali metal or an alkaline earth metal, R represents hydrogen or a metal radical, X represents chlorine, a lower alkoxy or acyloxy group or a cyanide radical, m ranges from 12 to 67, n ranges from 33 to 88, p ranges from 0 to 10, and the sum of $m$, $n$, and $p$ equals 100, and $z$ is at least about 60. This class of polymers is known for the purpose of increasing the viscosity of the injected fluid and the efficiency with which the injected fluid displaces petroleum, specifically being disclosed in U.S. Pat. No. 3,039,529 (1962). Polyacrylamide itself is also a highly satisfactory polymer for use in the polymer slug of this invention.

Other excellent polymers for use in the aqueous polymer slug are the polyvinyl aromatic sulfonates having relatively high molecular weights and yet being soluble in water. Polymers of this class have the following general formula:

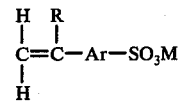

wherein Ar is divalent monocyclic hydrocarbon unit derived from benzene or benzene derivatives, R is hydrogen or a metal ion, and M is hydrogen, sodium or potassium. The use of this polymer for mobility ratio improvement in oil recovery operations is more fully detailed in U.S. Pat. No. 3,282,337 (1966).

Another class of hydrophilic polymers which can be used for mobility control in the polymer slug, if employed, is the flocculant grade water soluble polyethylene oxides such as described in U.S. Pat. No. 3,021,231.

In selecting a surfactant or surfactants for use in the surfactant water slug employed in this invention any of the surfactants commonly employed in petroleum recovery systems may be utilized.

Surfactants are classified on the basis of the hydrophilic or water soluble groups in the molecule and are generally recognized as falling in one of the following groups:
1. Anionic, meaning the surfactant molecule has one or more anionic, hydrophilic or water soluble groups. The most typical of these groups are the carboxylates, sulfonates, sulfates, and phosphates. The anionic surfactants are by far the most important group, and are the surfactants of choice in oil recovery operations unless there are compelling reasons to resort to the use of other types of surfactants.
2. Cationic surfactants, wherein the hydrophilic or water soluble groups are primary, secondary or tertiary amines or quaternary ammonium groups.
3. Nonionic surfactants which are characterized by the occurrence of hydroxyl or polyoxyethylene chains which provide the hydrophilic character to the molecule.
4. An amphoteric group is sometimes recognized for molecules having combinations of anionic and cationic moieties present on the same molecule.

The hydrophobic or oil soluble component of a surfactant molecule is almost always a hydrocarbon or halogen substituted hydrocarbon.

The molecular weight of surfactants ranges from around 200 to about 20,000 or more and preferably from about 300 to about 600. Commercially available surfactants are seldom composed essentially of the same molecular species; rather they are more often polydispersed compounds (the molecules all have the same functional groups but vary in chain length or some other structural detail).

Petroleum sulfonates which are presently among the more popular classes of surfactants being considered for supplemental oil recovery techniques also may be employed in this process. The various materials available under the general name of petroleum fraction used for sulfonation and in the degree of sulfonation imparted to the petroleum fraction. A preferable petroleum sulfonate is described in U.S. Pat. No. 3,302,713 (1967) disclosing a petroleum sulfonate prepared from a petroleum fraction whose boiling range is from 700° to 1100° F which corresponds to a molecular weight range of from about 350 to about 600. The sodium salt of the sulfonation product of this petroleum fraction is an excellent material for use in the subject invention.

One surfactant composition which has shown to be especially good consists of a dual surfactant system comprising a sodium salt of tridecylbenzene sulfonate (Conoco 650) and as a solubilizer surfactant a sodium sulfated/sulfonated polyethoxylated nonyl phenol. These particular materials which are anionic surfactants have average molecular weights equal to 362 and 518, respectively. In this dual surfactant system three parts by weight of sodium tridecylbenzene sulfonate and one part sulfated/sulfonated ethoxylated nonyl phenol are employed in water containing about 1 percent total dissolved solids. Such surfactant compositions are highly effective in mobilizing and recovering oil from limestone formations. Other dual surfactant systems such as the sodium or ammonium salt of alkyl aryl sulfonic acid and nonionic surfactants such as polyethoxylated alkyl phenols are also effective in the process of this invention. Another anionic surfactant useful in this process as a solubilizer in the surfactant solution is sodium tridecyl polyethoxylated sulfate. Petroleum sulfonates which likewise are also useful in the process of this invention but require increased concentrations.

The results obtained in an experiment in which oil recovery by surfactant flooding was determined as a function of surfactant concentration in field water (salinity — 10,000 ppm) are shown in FIG. 1. A Cordova Cream limestone core was initially water and oil saturated and then allowed to imbibe water and produce oil at 200 psig. After 75 hours of imbibition the oil saturation was reduced from 0.65 pore volume to 0.43. The experiment was continued by water flooding the core to a residual oil saturation of 0.39 m$^3$/m$^3$. A surfactant flood followed the water flood using a surfactant concentration of approximately 2 kg/m$^3$ (0.2% by weight). After 2.8 pore volume of injection, the residual oil saturation decreased to 0.33 m$^3$/m$^3$. At this time, the core was flooded again with the same surfactant having a concentration of approximately 4 kg/m$^3$ (0.4% by weight). The additional 2.32 pore volume injected during the second surfactant flood reduced the residual oil saturation to 0.23 m$^3$/m$^3$. This test shows that oil recovery is directly related to the total surfactant injected through the core. This relationship is shown in FIG. 1 (upper curve) where the oil recovery is expressed as a function of cumulative surfactant, i.e., pore volume injected times the surfactant concentration. The lower curve in FIG. 1 is the result of a surfactant flood using a similar "Cordova Cream" limestone core and a constant surfactant concentration of approximately 8 kg/m$^3$ (0.8% by weight). All floods were made with the same field liquids and surfactant type. Results in FIG. 1 indicate that surfactant injection at lower concentrations initially, tapered gradually to a greater concentration, give more efficient oil recovery than a surfactant slug injection having a constant concentration.

If desired, the drive fluid, which is preferably water, may contain dissolved therein from about 0.01 to about 1.00 percent or more by weight of a solubilizing agent and in addition the drive fluid employed in this invention may include an alkaline agent in an amount sufficient to form a 0.001 to about 0.1 molar solution. Useful alkaline agents include sodium hydroxide, potassium hydroxide, sodium hypochlorite, etc.

A wide variety of solubilizing agents may be utilized in the drive fluid of this invention. An especially useful group of solubilizing agents are water-soluble, oxyalkylated, alkyl alkanolamine compounds of the formula:

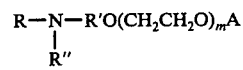

wherein R is alkyl of from 1 to about 16 carbon atoms; wherein R' is alkylene of from 2 to 4 inclusive carbon atoms as exemplified by ethylene, propylene, butylene, isobutylene, etc. and m is an integer of from 4 to about 60 or more; A is selected from the group consisting of hydrogen, sodium, potassium and the ammonium ion, and wherein R'' is selected from the group consisting of hydrogen, alkyl of from 1 to about 16 carbon atoms and —R'O (CH$_2$CH$_2$O)$_m$H. Typical alkyl groups include methyl, ethyl, isopropyl, n-butyl, isohexyl, n-heptyl, n-decyl, n-dodecyl, etc.

The above-described, oxyalkylated, alkyl alkanol amines can be conveniently prepared by methods well known in the art from commercially available alkyl alkanol amines. For example, these oxyalkylated compounds can be made by the methods set out in U.S. Pat. Nos. 3,062,747; 2,174,761 or 2,435,755. In general, the procedure consists of reacting the alkyl alkanol amine with ethylene oxide in the presence of an oxyalkylation catalyst such as sodium hydroxide at about 150° C in a stirred autoclave.

Another group of solubilizer compounds which are highly useful in the aqueous drive fluid employed in the process of this invention are the sulfated and sulfonated derivatives of the previously described oxyalkylated alkyl alkanol amines as well as the alkali metal and ammonium salts of such sulfated or sulfonated derivatives.

Sulfated, oxyalkylated, alkyl alkanol amines useful as solubilizers in the drive fluid of this invention include compounds of the formula:

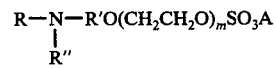

wherein R is alkyl of from 1 to about 16 carbon atoms; R' is alkylene of from 2 to 4 inclusive carbon atoms, m is an integer of from about 4 to about 60, A is selected from the group consisting of hydrogen, sodium, potassium, and the ammonium ion and wherein R'' is selected from the group consisting of hydrogen, alkyl of from 1 to about 16 carbon atoms and R'O(CH$_2$CH$_2$O)$_m$SO$_3$A. The sulfated, oxyalkylated alkyl alkanol amines can be prepared by methods well known in the art such as by treatment of the oxyalkylated, alkyl alkanol amine with sulfuric acid followed by neutralization to form the metal or ammonium salt, if desired.

Sulfonated derivatives of these same oxyalkylated alkyl alkanol amines can likewise be prepared by reacting the above-described sulfated products with sodium sulfite at temperatures of about 150° to about 200° C or more for about 5 to 10 hours. The sulfonated compounds and their metal and ammonium salts suitable for use as solubilizing agents in the polymer slug or drive fluid of this invention have the formula:

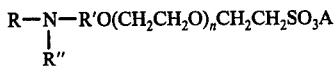

where R, R', and A have same meaning as described for the sulfated oxyalkylated, alkyl alkanol amines set out above; n is an integer of from about 4 to about 60 and R" is selected from the group consisting of hydrogen, alkyl of from 1 to about 16 carbon atoms and —R'O(CH$_2$C-H$_2$O)$_n$CH$_2$CH$_2$SO$_3$A.

EXAMPLE I

The following example illustrates one embodiment of this invention and is to be considered not limitative.

A petroleum-containing formation located at a depth of 6200 feet in a limestone formation is exploited by means of conventional water flooding operations using an inverted five spot pattern until the water-oil ratio rises above about 30. The formation thickness is 20 feet and the porosity is 25 percent. In this inverted five spot pattern the center well is employed as an injection well while the four remaining wells serve as production wells. The dimensions of the square grid on which the inverted five spot pattern is based is 500 feet and it is known that only 75 percent of the reservoir volume will be swept by the injected fluid using the standard five spot pattern. The pore volume of the pattern swept by the injected fluid will be 500 × 500 × 20 × 0.25 × 0.75 = 937,500 cubic feet. The salinity of the water contained in the formation is about 60,000 parts per million. A total of 0.1 pore volume (93,750 cubic feet) of a preflush solution having a salinity of about 10,000 parts per million and having dissolved therein 0.01 weight percent of sodium tripolyphosphate is injected into the formation via the injection well. This is followed by the injection into the formation of the surfactant slug which consists of four parts. In the first part a surfactant slug equal to about 0.1 pore volume or 93,750 cubic feet comprising water containing 0.2 percent by weight of a dual surfactant system (0.7 lb/bbl) consisting of the sodium salt of tridecylbenzene sulfonate and sodium sulfated/sulfonated ethoxylated nonyl phenol having 4 oxyethylene units and consisting of 80 percent by weight of the sulfate and 20 percent by weight of the sulfonate, is injected into the formation. Next, a second surfactant slug equal to about 0.1 pore volume comprising water containing 0.4 weight percent (i.e., 1.4 lb/bbl) of the same surfactants in the same proportions is injected into the formation followed by injection of a third slug of equal size comprising water containing 0.80 weight percent (i.e., 2.8 lbs/bbl) of the same surfactants. Finally, a fourth surfactant slug of about 0.2 pore volume comprising water and 1 weight percent (i.e., 3.5 lbs/bbl) of the same surfactants is injected into the formation. About 3 parts by weight of the sodium salt of tridecylbenzene sulfonate was utilized for each part by weight of the sodium sulfated/sulfonated ethoxylated nonyl phenol included in each of the surfactant slugs. Next 0.4 pore volume (375,000 cubic feet) of water containing 800 parts per million of the polysaccharide Kelzan MF is injected into the formation. This is followed by the injection of drive water having a salinity of about 10,000 parts per million and containing 0.02 weight percent of a sulfonate solubilizer of the formula:

to displace the oil, surfactant solution and thickened water through the formation. Oil is produced through the associated production wells in the five spot pattern, and the amount of oil produced is substantially in excess of that produced by water flooding alone.

The increased recovery achieved in the process of this invention is also shown by the results set out in Tables 1 and 2 which follow. All flood tests included in these tables were conducted on cores which had first been water flooded until no additional oil was produced after which a single surfactant slug of specific surfactant concentration (i.e., a non-tapered slug) or a surfactant slug which comprised from 2 to 4 parts of equal or different pore volume size in which the concentration of the surfactant was increased in each successive part (i.e., a tapered slug) was injected into the core. Following the surfactant slugs field brine with 1000 parts per million of a polysacharide (commercially available under the trade name Kelzan MF from the Kelco Company, San Diego, Calif.) was forced through the core until no additional oil was produced. The total amount of oil recovered by injection of the surfactant slug and the polymer thickened water was measured to determine the amount of tertiary oil recovered in this tertiary recovery process. The relative efficiency of the recovery process was determined by the following formula:

$$\text{Tertiary Recovery to Surfactant Ratio} = \frac{E_r}{(V_p \times \%C_s)}$$

where $E_r$ = tertiary oil recovery in percent of oil in place (i.e., after water flooding), $V_p$ = injected pore volume, ml/ml, $\%C_s$ = surfactant concentration in percent.

TABLE 1

Tertiary Flood Results in 4 to 8 in. Limestone Cores (2 in. dia.).
Permeability (k) = 11 to 40 md.
Porosity (φ) = 17 to 21 percent
Surfactant slug — ethoxylated dodecylphenol sulfonate in 85,000 ppm salinity water.

| | | Oil Recovery By Tertiary Flood, % | $E_r$ / $V_p$ × $\%C_s$ | |
|---|---|---|---|---|
| Flood No. | Surfactant Type | | Tapered Slug | Non-Tapered Slug |
| 1 | *4EO | 33.6 | | 0.77 |
| 2 | " | 53.6 | 1.07 | |
| 3 | " | 38.0 | | 0.56 |
| 4 | " | 42.7 | | 0.85 |
| 5 | " | 28.1 | | 0.55 |
| 6 | " | 52.4 | | 0.55 |
| 7 | " | 57.9 | 1.52 | |
| 8 | " | 56.9 | 1.49 | |
| 9 | " | 39.6 | | 0.79 |
| 10 | " | 55.4 | | 1.11 |
| 11 | " | 38.3 | 1.19 | |
| Average Ratios | | | 1.32 | 0.81 |

*The single surfactant utilized was an ethoxylateddodecylphenol sulfonate having 4 ethylene oxide units.

TABLE 2

Tertiary Flood Results in 7″ Berea (sandstone) Cores
k = 110 to 302 md
φ = 20 to 22%
Surfactant slug — ethoxylated dodecylphenol
sulfonate in 85,000 ppm salinity water.

| Flood | Surfactant Type | Oil recovery by Tertiary Flood, (%) | E Vp X %Cs Tapered Slug | Non-Tapered Slug |
|---|---|---|---|---|
| 12 | *4EO | 57.3 | | 0.88 |
| 13 | " | 43.4 | 1.11 | |
| 14 | " | 63.1 | 1.87 | |

*The single surfactant was the same as in Table 1.

The results in both Tables 1 and 2 indicate that substantially more oil is recovered when the tapered surfactant concentration slug is utilized.

What is claimed is:

1. A method of recovering oil from a subterranean oil-bearing formation having in communication therewith at least one injection well and at least one production well comprising:
   (a) injecting into the formation via the injection well a slug of a surfactant solution;
   (b) injecting water into the formation via the injection well; and
   (c) recovering oil from the formation via the said production well and wherein the concentration of the surfactant in the said slug is increased as the slug is injected into the said formation, wherein the water injected in step (b) contains dissolved therein a small amount of a solubilizing agent selected from the group consisting of:
   (a) a compound of the formula:

$$R-N(R'')-R'O(CH_2CH_2O)_mA$$

wherein R is alkyl of from 1 to about 16 carbon atoms; wherein R' is alkylene of from 2 to 4 inclusive carbon atoms; m is an integer of from 8 to about 60; A is selected from the group consisting of hydrogen, sodium, potassium and the ammonium ion and wherein R'' is selected from the group consisting of hydrogen, alkyl of from 1 to about 16 carbon atoms and R'O(CH$_2$CH$_2$O)$_m$A;

(b) a sulfated compound of the formula:

$$R-N(R'')-R'O(CH_2CH_2O)_mSO_3A$$

wherein R, R', m and A have the same meaning as in (a) above, and R'' is selected from the group consisting of hydrogen, alkyl of from 1 to about 16 carbon atoms and R'O(CH$_2$CH$_2$O)$_m$SO$_3$A, and (c) a sulfonated compound of the formula:

$$R-N(R'')-R'O(CH_2CH_2O)_nCH_2CH_2SO_3A$$

wherein R, R' and A have the same meaning as in (a) above; wherein n is an integer of from about 8 to about 60 and R'' is selected from the group consisting of hydrogen, alkyl of from 1 to about 16 carbon atoms and R'O(CH$_2$CH$_2$O)$_n$CH$_2$CH$_2$SO$_3$A.

2. The method of claim 1 wherein prior to step (a) a preflush slug of water is injected into the formation via the injection well.

3. The method of claim 1 wherein the concentration of the surfactant in the said surfactant slug is incrementally increased as the slug is injected into the said formation.

4. The method of claim 1 wherein the concentration of the surfactant in the said surfactant slug is continuously increased as the slug is injected into the formation.

5. The method of claim 1 wherein the said water injected in step (b) also contains an alkaline agent.

6. The method of claim 1 wherein the said water injected in step (b) is saline water.

7. The method of claim 1 wherein the water injected in step (b) contains dissolved therein a small amount of a solubilizing agent of the formula:

$$R-N(R'')-R'O(CH_2CH_2O)_mA$$

wherein R is alkyl of from 1 to about 16 carbon atoms; wherein R' is alkylene of from 2 to 4 inclusive carbon atoms; m is an integer of from 8 to about 60; A is selected from the group consisting of hydrogen, sodium, potassium and the ammonium ion and wherein R'' is selected from the group consisting of hydrogen, alkyl of from 1 to about 16 carbon atoms and R'O(CH$_2$C-H$_2$O)$_m$H.

8. The method of claim 1 wherein the water injected in step (b) contains dissolved therein a small amount of a solubilizing agent of the formula:

$$R-N(R'')-R'O(CH_2CH_2O)_mSO_3A,$$

wherein R is alkyl of from 1 to about 16 carbon atoms, wherein R' is alkylene of from 2 to 4 inclusive carbon atoms, m is an integer of from 8 to about 60, A is selected from the group consisting of hydrogen, sodium, potassium and the ammonium ion and wherein R'' is selected from the group consisting of hydrogen, alkyl of from 1 to about 16 carbon atoms and R'O(CH$_2$C-H$_2$O)$_m$H.

9. The method of claim 1 wherein the water injected in step (b) contains dissolved therein a small amount of a solubilizing agent of the formula:

$$R-N(R'')-R'O(CH_2CH_2O)_nCH_2CH_2SO_3A,$$

wherein R is alkyl of from 1 to about 16 carbon atoms, R' is alkylene of from 2 to 4 inclusive carbon atoms, n is an integer of from 8 to about 60, A is selected from the group consisting of hydrogen, sodium, potassium and the ammonium ion and wherein R'' is selected from the group consisting of hydrogen, alkyl of from 1 to about 16 carbon atoms and R'O(CH$_2$CH$_2$O)$_n$ CH$_2$CH$_2$SO$_3$A.

* * * * *